United States Patent
Imamura

(10) Patent No.: US 7,613,374 B2
(45) Date of Patent: Nov. 3, 2009

(54) OPTICAL FIBER AND OPTICAL-FIBER TRANSMISSION LINE

(75) Inventor: Katsunori Imamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/133,782

(22) Filed: Jun. 5, 2008

(65) Prior Publication Data

US 2008/0273850 A1  Nov. 6, 2008

Related U.S. Application Data

(63) Continuation of application No. PCT/JP2007/069484, filed on Oct. 4, 2007.

(30) Foreign Application Priority Data

Oct. 4, 2006   (JP)   ............... 2006-273110

(51) Int. Cl.
*G02B 6/028* (2006.01)
*G02B 6/036* (2006.01)
(52) U.S. Cl. ..................... 385/124; 385/127
(58) Field of Classification Search ........... 385/124, 385/127
See application file for complete search history.

(56) References Cited

U.S. PATENT DOCUMENTS 5,742,723 A * 4/1998 Onishi et al. ............. 385/127
6,157,754 A   12/2000 Sasaoka et al.
6,169,837 B1   1/2001 Kato et al.
6,343,176 B1 * 1/2002 Li et al. .................... 385/127
6,498,874 B1  12/2002 Kato et al.
6,535,677 B1   3/2003 Tanaka et al.
6,694,079 B1   2/2004 Matsuo et al.

FOREIGN PATENT DOCUMENTS

| JP | 2000-174705 A | 6/2000 |
| JP | 2001-51147 A | 2/2001 |
| JP | 2001-255433 A | 9/2001 |
| JP | 2004-271904 | 9/2004 |
| WO | WO 01/23924 A1 | 4/2001 |

OTHER PUBLICATIONS

Masatoshi Suzuki, et al., "Dispersion-Managed High-Capacity Ultra-Long-Haul Transmission", Journal of Lightwave Technology, vol. 21, No. 4, Apr. 2003, pp. 916-929.
U.S. Appl. No. 12/041,230, filed Mar. 3, 2008, Imamura.
U.S. Appl. No. 12/046,059, filed Mar. 11, 2008, Imamura.
U.S. Appl. No. 12/133,782, filed Jun. 5, 2008, Imamura.

* cited by examiner

*Primary Examiner*—Jerry T Rahll
(74) *Attorney, Agent, or Firm*—Oblon, Spivak, McClelland, Maier & Neustadt, P.C.

(57) ABSTRACT

An optical fiber that transmits a signal light in a fundamental propagation mode has a cutoff wavelength longer than a wavelength of the signal light, a wavelength dispersion of the fundamental propagation mode of −5 ps/nm/km to −1 ps/nm/km at a wavelength of 1550 nanometers, an effective core area of the fundamental propagation mode larger than 45 $\mu m^2$ at the wavelength of 1550 nanometers, and a dispersion slope of the fundamental propagation mode smaller than 0.03 $ps/nm^2$/km at the wavelength of 1550 nanometers.

7 Claims, 14 Drawing Sheets

FIG.3

| PARAMETER | Δ1 | Δ2 | Δ3 | α1 | Ra2 | Ra3 | 2a | DISPERSION | SLOPE | Aeff | λc |
|---|---|---|---|---|---|---|---|---|---|---|---|
| UNIT | % | % | % | | | | μm | ps/nm/km | ps/nm²/km | μm² | nm |
| No. 1 | 0.65 | -0.3 | 0.3 | 2 | 1.8 | 2.5 | 7.38 | -4.0 | 0.003 | 45.7 | 1809 |
| No. 2 | 0.4 | -0.3 | 0.4 | 5 | 2.2 | 2.9 | 9.31 | -2.0 | -0.067 | 83.1 | 3052 |
| No. 3 | 0.5 | -0.3 | 0.4 | 8 | 2.2 | 2.9 | 7.15 | -2.4 | -0.035 | 49.4 | 2272 |
| No. 4 | 0.6 | -0.9 | 0.3 | 2 | 1.3 | 2.0 | 8.18 | -3.3 | 0.024 | 51.5 | 1668 |
| No. 5 | 0.5 | -0.9 | 0.3 | 2 | 1.4 | 2.3 | 9.82 | -3.1 | -0.032 | 66.3 | 2557 |
| No. 6 | 0.55 | -0.3 | 0.3 | 5 | 1.8 | 2.5 | 6.83 | -4.0 | 0.021 | 49.0 | 1674 |
| No. 7 | 0.4 | -0.9 | 0.2 | 8 | 1.3 | 2.7 | 9.11 | -3.0 | 0.023 | 80.2 | 2650 |
| No. 8 | 0.55 | -0.3 | 0.3 | 5 | 2.0 | 2.8 | 6.92 | -3.8 | -0.015 | 45.8 | 1948 |
| No. 9 | 0.55 | -0.6 | 0.2 | 2 | 1.6 | 3.1 | 8.96 | -1.4 | -0.135 | 48.7 | 2918 |
| No. 10 | 0.5 | -0.3 | 0.3 | 5 | 1.8 | 2.6 | 7.45 | -3.3 | 0.018 | 56.7 | 2058 |
| No. 11 | 0.3 | -0.6 | 0.2 | 2 | 1.4 | 2.6 | 16.49 | -4.1 | -0.090 | 206.7 | 4846 |
| No. 12 | 0.55 | -0.1 | 0.2 | 5 | 2.5 | 3.6 | 6.47 | -1.3 | 0.011 | 49.5 | 2145 |
| No. 13 | 0.6 | -0.1 | 0.1 | 5 | 2.2 | 4 | 5.97 | -3.0 | 0.024 | 45.9 | 1755 |
| No. 14 | 0.5 | -0.4 | 0.75 | 5 | 2.1 | 2.5 | 7.68 | -2.0 | -0.028 | 54.2 | 2260 |
| No. 15 | 0.5 | -0.1 | 0.5 | 5 | 3.5 | 4.1 | 7.10 | -2.3 | -0.106 | 54.8 | 3271 |
| No. 16 | 0.5 | -0.3 | 0.3 | - | 2 | 2.8 | 6.43 | -3.1 | 0.015 | 51.3 | 1811 |

FIG.4

| PARAMETER | Δ1 | Δ2 | Δ3 | α1 | Ra2 | Ra3 | 2a | DISPERSION | SLOPE | Aeff | λc |
|---|---|---|---|---|---|---|---|---|---|---|---|
| UNIT | % | % | % | | | | μm | ps/nm/km | ps/nm²/km | μm² | nm |
| FIRST EMBODIMENT EXAMPLE | 0.54 | -0.3 | 0.3 | 5 | 1.8 | 2.6 | 6.99 | -4.1 | -0.040 | 47.2 | 2100 |
| SECOND EMBODIMENT EXAMPLE | 0.5 | -0.2 | 0.4 | 5 | 2.8 | 3.6 | 7.38 | -2.7 | -0.127 | 50.8 | 3000 |
| THIRD EMBODIMENT EXAMPLE | 0.5 | -0.3 | 0.35 | 5 | 1.9 | 3.1 | 7.99 | -3.3 | -0.012 | 59.1 | 2800 |

CENTER AXIS

CENTER AXIS

OPTICAL FIBER AND OPTICAL-FIBER TRANSMISSION LINE

CROSS-REFERENCE TO RELATED APPLICATIONS

This application is a continuation of PCT/JP2007/069484 filed on Oct. 4, 2007, the entire content of which are incorporated herein by reference.

BACKGROUND OF THE INVENTION

1. Field of the Invention

The present invention relates to an optical fiber and an optical transmission line for a long-haul optical transmission.

2. Description of the Related Art

In a long-haul optical transmission line, a technology for enhancing the characteristics of a transmission line is used in a positive manner by building an optical transmission line combining two types of optical fibers having different optical characteristics. A dispersion-managed optical fiber transmission line and a nonzero dispersion-shifted optical fiber transmission line are representative examples of the technology (see, for example, M. Suzuki, et al., "Dispersion-Managed High-Capacity Ultra-Long-Haul Transmission", J. Lightwave technol., vol. 21, no. 4, pp. 916-929, April 2003). In the dispersion-managed optical fiber transmission line, the overall wavelength dispersion is managed to be zero by combining a positive dispersion fiber having a positive wavelength dispersion and a negative dispersion fiber having a negative wavelength dispersion. The nonzero dispersion-shifted optical fiber transmission line is configured by combining a large-effective area (Aeff)-type nonzero dispersion-shifted optical fiber having a large effective core area and a low-slope-type nonzero dispersion-shifted optical fiber having a small dispersion slope. The nonzero dispersion-shifted optical fiber is a single-mode optical fiber having a small wavelength dispersion at a wavelength of a signal light, for example, about −5 ps/nm/km to −2 ps/nm/km or about 2 ps/nm/km to 5 ps/nm/km, and a nonzero dispersion-shifted optical fiber having a negative dispersion is referred to as a negative-dispersion nonzero dispersion-shifted optical fiber. The negative-dispersion nonzero dispersion-shifted optical fiber is widely used for a submarine cable.

The optical characteristics of the large-Aeff-type nonzero dispersion-shifted optical fiber show, for example, an effective core area of 75 $\mu m^2$, a dispersion slope of 0.10 $ps/nm^2/km$, and the optical characteristics of the low-slope-type nonzero dispersion-shifted optical fiber show, for example, an effective core area of 50 $\mu m^2$, a dispersion slope of 0.05 $ps/nm^2/km$. After all, the average optical characteristics of a negative-dispersion nonzero dispersion-shifted optical fiber transmission line built by connecting virtually the same lengths of the above optical fibers show an effective core area of 65 $\mu m^2$, a dispersion slope of 0.07 $ps/nm^2/km$.

Most commonly, in the nonzero dispersion-shifted optical fiber transmission line, the optical signal is transmitted from the large-Aeff-type nonzero dispersion-shifted optical fiber side. As a result, in a state in which the optical intensity of the optical signal is large, the large effective core area of the optical transmission line effectively suppresses an occurrence of the nonlinear optical phenomena. After that, the optical intensity of the optical signal is attenuated due to a transmission loss of the optical fiber, and then the optical signal is input into the low-slope-type nonzero dispersion-shifted optical fiber. Although the low-slope-type nonzero dispersion-shifted optical fiber has a relatively small effective core area, the wavelength dispersion is less dependent on the wavelength owing to a small dispersion slope. As a result, in the case of transmitting a wavelength-division-multiplexed (WDM) optical signal in which optical signals having different wavelengths are wavelength multiplexed, an occurrence of a discrepancy of the wavelength dispersion between the optical signals can be effectively suppressed.

In other words, there is a tradeoff relationship between the effective core area and the dispersion slope in the nonzero dispersion-shifted optical fiber. For this reason, as described above, it is attempted to relieve the tradeoff relationship as the whole optical fiber transmission line in the nonzero dispersion-shifted optical fiber transmission line by arranging a nonzero dispersion-shifted optical fiber having a large effective core area at an earlier stage of transmitting an optical signal and arranging a nonzero dispersion-shifted optical fiber having a small dispersion slope at a later stage.

On the other hand, in the dispersion-managed optical transmission line, a technology of greatly enlarging the effective core area is disclosed, by employing a multimode optical fiber as the negative-dispersion fiber (see, for example, Japanese Patent Application Laid-open Publication No. 2004-271904).

However, particularly in a nonzero dispersion-shifted optical fiber transmission line used for a submarine application, an even longer transmission distance is required, but there is a problem that an accumulation of the discrepancy of the wavelength dispersion between the optical signals gets in the way of extending the transmission distance. On the other hand, if the optical fiber is designed to have a small dispersion slope to resolve the discrepancy of the wavelength dispersion between the optical signals, the effective core area is decreased, which causes a problem of a remarkable occurrence of the nonlinear optical phenomena.

SUMMARY OF THE INVENTION

It is an object of the present invention to at least partially solve the problems in the conventional technology.

According to an aspect of the present invention, there is provided an optical fiber that propagates a signal light in a fundamental propagation mode. The optical fiber has a cutoff wavelength longer than a wavelength of the signal light, a wavelength dispersion of the fundamental propagation mode of −5 ps/nm/km to −1 ps/nm/km at a wavelength of 1550 nanometers, an effective core area of the fundamental propagation mode larger than 45 $\mu m^2$ at a wavelength of 1550 nanometers, and a dispersion slope of the fundamental propagation mode smaller than 0.03 $ps/nm^2/km$ at a wavelength of 1550 nanometers.

Furthermore, according to another aspect of the present invention, there is provided an optical fiber transmission line including an optical fiber that propagates a signal light in a fundamental propagation mode. The optical fiber has a cutoff wavelength longer than a wavelength of the signal light, a wavelength dispersion of the fundamental propagation mode of −5 ps/nm/km to −1 ps/nm/km at a wavelength of 1550 nanometers, an effective core area of the fundamental propagation mode larger than 45 $m^2$ at a wavelength of 1550 nanometers, and a dispersion slope of the fundamental propagation mode smaller than 0.03 $ps/nm^2/km$ at a wavelength of 1550 nanometers.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of design parameters of the optical fiber according to the first embodiment and calculated optical characteristics of the optical fiber in the fundamental propagation mode;

FIG. 4 is a table of design parameters of optical fibers according to a first to a third embodiment examples fabricated following the first embodiment and measured optical characteristics of the optical fibers in the fundamental propagation mode;

DETAILED DESCRIPTION OF THE PREFERRED EMBODIMENTS

Exemplary embodiments of an optical fiber and an optical transmission line according to the present invention will be explained in detail below with reference to the accompanying drawings. However, the present invention is not to be considered limited to the embodiments. A bending loss referred in the specification means a bending loss in a case of winding 16 turns with a winding diameter of 20 millimeters. A cutoff wavelength referred in the specification means the fiber cutoff wavelength defined in the ITU-T (International Telecommunication Union Telecommunication Standardization Sector) G. 650. 1. Other terminologies not specifically defined in this specification comply with the definitions and the measurement methods in the ITU-T G. 650. 1.

An optical fiber according to a first embodiment of the present invention propagates a signal light having a wavelength of 1530 nanometers to 1570 nanometers including a wavelength band from 1530 nanometers to 1565 nanometers which is called the C-band in the fundamental propagation mode, having a cutoff wavelength equal to or longer than 1600 nanometers which is sufficiently longer than the wavelength of the signal light, and a wavelength dispersion of −5 ps/nm/km to −1 ps/nm/km, an effective core area larger than 45 μm$^2$, and a dispersion slope smaller than 0.03 ps/nm$^2$/km, in the fundamental propagation mode at the wavelength of 1550 nanometers.

In other words, the optical fiber according to the first embodiment is a multimode optical fiber in which multiple propagation modes exist at the wavelength of the signal light because it has a cutoff wavelength longer than the wavelength of the signal light. Therefore, a tradeoff relationship between the effective core area and the dispersion slope is relieved in the fundamental propagation mode, which has been caused by a design limitation of making the cutoff wavelength shorter than the wavelength of the signal light to make it a single-mode optical fiber in which only the fundamental propagation mode exists as the propagation mode. As a result, the characteristics of the fundamental propagation mode at the wavelength of the signal light show a wavelength dispersion and an effective core area equivalent to those of the conventional low-slope-type nonzero dispersion-shifted optical fiber and a considerably smaller dispersion slope than 0.05 ps/nm$^2$/km that is the dispersion slope of the conventional low-slope-type nonzero dispersion-shifted optical fiber. Therefore, an increase of the discrepancy of the accumulated wavelength dispersion between the signal lights can be greatly suppressed compared to the conventional case while suppressing an occurrence of the nonlinear optical phenomena in virtually the same level as the conventional case.

Figure 1:
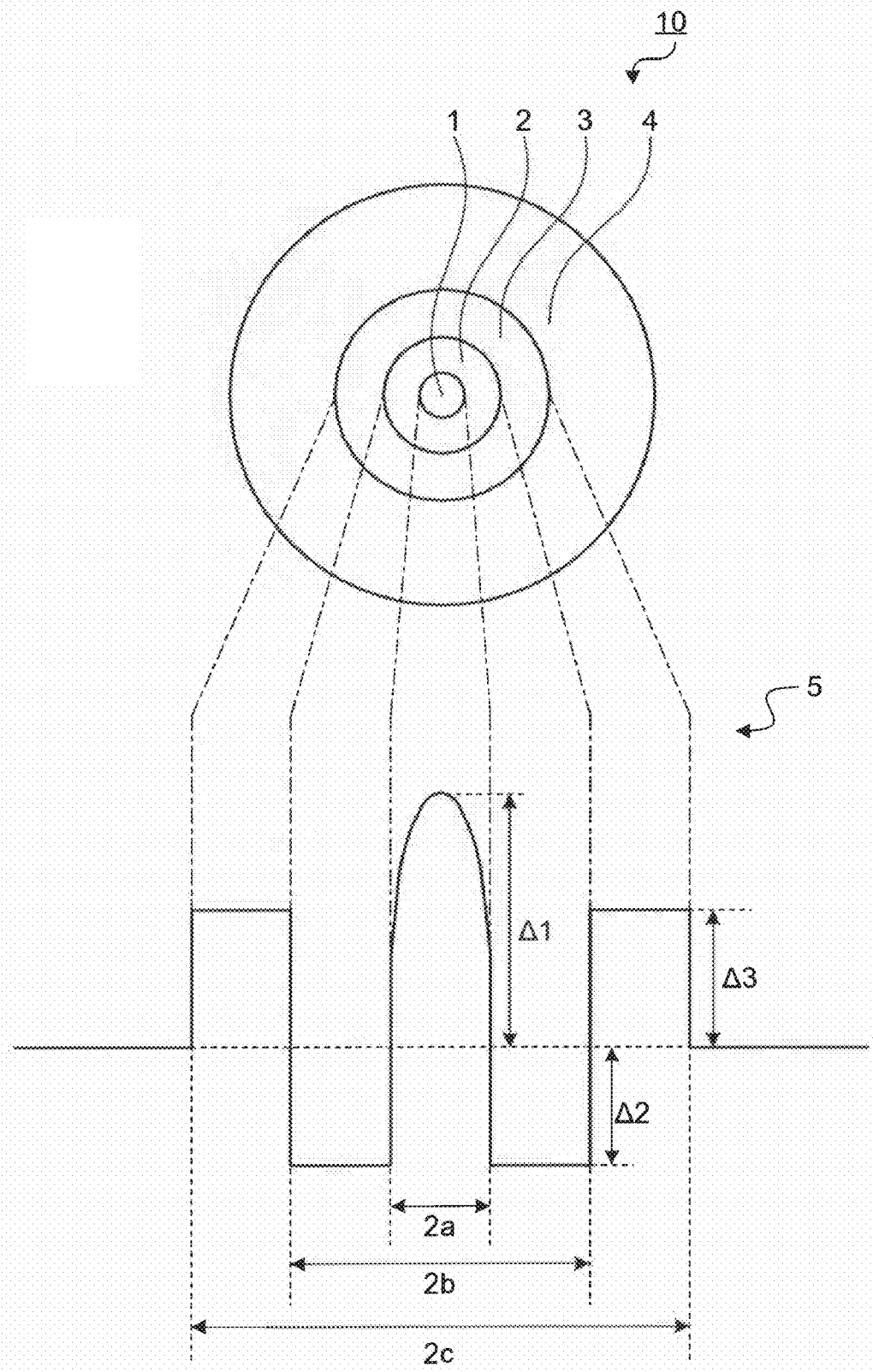
FIG. 1 is a schematic diagram of the cross section of an optical fiber according to a first embodiment of the present invention and its corresponding refractive index profile.

FIG. 1 is a schematic diagram of the cross section of an optical fiber 10 according to the first embodiment of the present invention and its corresponding refractive index profile. As shown in FIG. 1, the optical fiber 10 according to the first embodiment includes a center core region 1, an inner core layer 2 that is formed around the center core region 1 and that has a refractive index lower than a refractive index of the center core region 1, an outer core layer 3 that is formed around the inner core layer 2 and that has a refractive index higher than the refractive index of the inner core layer 2, and a cladding layer 4 that is formed around the outer core layer 3 and that has a refractive index higher than the refractive index of the inner core layer 2 and lower than the refractive index of the outer core layer 3. In other words, the optical fiber 10 has a refractive index profile 5 of so-called a W-segment type.

Figure 2:
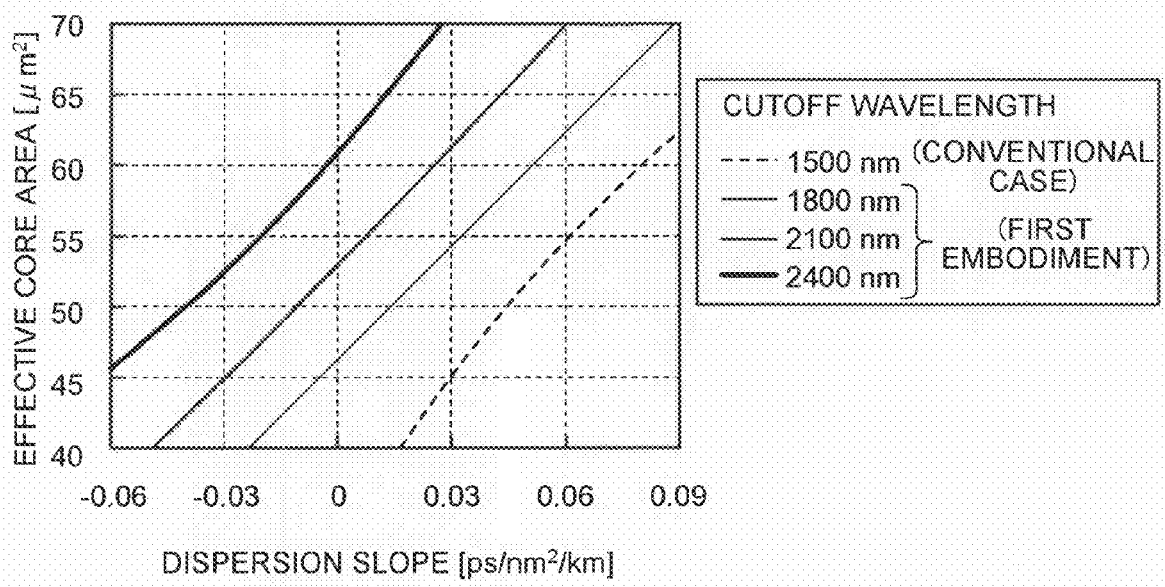
FIG. 2 is a graph showing a relationship between the dispersion slope and the effective core area at a wavelength of 1550 nanometers comparing the optical fiber according to the first embodiment when its cutoff wavelength is 1800 nanometers, 2100 nanometers, and 2400 nanometers with a low-slope-type nonzero dispersion-shifted optical fiber having a conventional W-segment-type refractive index profile when its cutoff wavelength is 1500 nanometers.

FIG. 2 is a graph showing a relationship between the dispersion slope and the effective core area at the wavelength of 1550 nanometers comparing the optical fiber 10 according to the first embodiment when its cutoff wavelength is 1800 nanometers, 2100 nanometers, and 2400 nanometers with a low-slope-type nonzero dispersion-shifted optical fiber having a conventional W-segment-type refractive index profile when its cutoff wavelength is 1500 nanometers As shown in FIG. 2, although the dispersion slope and the effective core area are in a tradeoff relationship with each other, in the optical fiber 10 according to the first embodiment, the tradeoff relationship is relieved compared to the conventional low-slope-type nonzero dispersion-shifted optical fiber, so that the dispersion slope can be taken to be smaller than 0.03 ps/nm$^2$/km while keeping the effective core area larger than 45 μm$^2$.

In the refractive index profile 5 of the optical fiber 10, a relative refractive index difference Δ1 of the center core region 1 with respect to the cladding layer 4 is equal to or smaller than 0.65%, a ratio Ra2 of the outer diameter of the inner core layer 2 to the diameter of the center core region 1, i.e., b/a, is equal to or larger than 1.3, a ratio Ra3 of the outer diameter of the outer core layer 3 to the diameter of the center core region 1, i.e., c/a, is equal to or larger than 2.0, and the diameter 2a of the center core region 1 is equal to or larger than 5.9 micrometers, preferably equal to or larger than 6.8 micrometers. As a result, the optical fiber 10 has a wavelength dispersion of −5 ps/nm/km to −1 ps/nm/km, an effective core area larger than 45 μm$^2$, a dispersion slope smaller than 0.03 ps/nm$^2$/km, and a bending loss with a winding diameter of 20 millimeters is equal to or smaller than 10 dB/m, which is sufficiently small in a practical usage, in the fundamental propagation mode at the wavelength of 1550 nanometers. If Ra2 and Ra3 are smaller than the above values, the dispersion slope becomes equal to or larger than 0.03 ps/nm$^2$/km, and if Δ1 is larger than the above range or if 2a is smaller than the above value, the effective core area becomes equal to or smaller than 45 μm$^2$, which is not desirable. In addition, if a relative refractive index difference Δ2 of the inner core layer 2 with respect to the cladding layer 4 is equal to or larger than −0.6%, the fabrication process becomes easy, which is desirable. In the refractive index profile 5, Δ3 is a relative refractive index difference of the outer core layer 3 with respect to the cladding layer 4.

FIG. 3 is a table of design parameters of the optical fiber 10 and calculated optical characteristics of the optical fiber in the fundamental propagation mode. The calculation was performed under a condition that the bending loss is kept to be equal to or smaller than 10 dB/m. In FIG. 3, "dispersion" means the wavelength dispersion, "slope" means the dispersion slope, "Aeff" means the effective core area, and "λc" means the cutoff wavelength. The dispersion, the dispersion slope, and the Aeff are those at the wavelength of 1550 nanometers. In addition, "α1" indicates an α value that defines a shape of the refractive index profile of the center core region 1, which is defined by $$n^2(r) = n_{core}^2(\{1 - 2 \times (\Delta/100)((r/a)^{\alpha 1}\} \quad (0 < r < a) \quad (1)$$

where, r is a point from the center of the center core region in the radial direction, n(r) is the refractive index at the point r, a is the radius of the center core region, and "^" is a symbol representing an exponential.

As shown in FIG. 3, all the optical fibers from No. 1 to No. 16 have Δ1 equal to or smaller than 0.65%, Ra2 equal to or larger than 1.3, Ra3 equal to or larger than 2.0, and 2a equal to or larger than 5.9 micrometers. As a result, the cutoff wavelength is equal to or longer than 1600 nanometers, and the wavelength dispersion is −5 ps/nm/km to −1 ps/nm/km, the effective core area is larger than 45 μm$^2$, and the dispersion slope is smaller than 0.03 ps/nm$^2$/km in the fundamental propagation mode. Although α1 of the optical fiber No. 16 is not written in FIG. 3, because the shape of the refractive index profile of the center core region is virtually a step-index type, α1 is an extremely larger value.

FIG. 4 is a table of design parameters of optical fibers according to a first to a third embodiment examples fabricated following the first embodiment and measured optical characteristics of the optical fibers in the fundamental propagation mode. Regarding the cutoff wavelength, because it is much longer than the wavelength of the signal light, it is difficult to measure the cutoff wavelength with a conventional measurement equipment for the optical communication, so that a value estimated from the design parameters is provided. As shown in FIG. 4, all of the optical fibers according to the first to the third embodiment examples have the cutoff wavelength equal to or longer than 2100 nanometers, and the wavelength dispersion of −4.1 ps/nm/km to −2.7 ps/nm/km, the effective core area larger than 47.2 μm$^2$, and the dispersion slope smaller than 0.012 ps/nm$^2$/km, in the fundamental propagation mode at the wavelength of 1550 nanometers.

Figure 5:
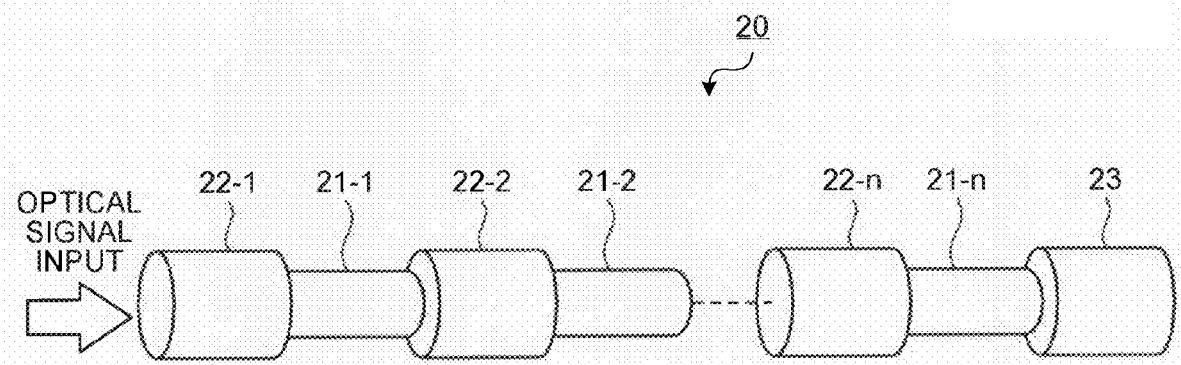
FIG. 5 is a schematic diagram of an optical fiber transmission line according to a second embodiment of the present invention.

FIG. 5 is a schematic diagram of an optical fiber transmission line 20 according to a second embodiment of the present invention. The optical fiber transmission line 20 includes optical fibers 21-1 to 21-n each of which is the same as the optical fiber according to the first embodiment and large-Aeff-type nonzero dispersion-shifted optical fibers 22-1 to 22-n that are alternately connected to the optical fibers 21-1 to 21-n. A signal light of the wavelength of 1550 nanometers is transmitted from the large-Aeff-type nonzero dispersion-shifted optical fiber 22-1. The optical fibers 21-1 to 21-n have the wavelength dispersion of −4 ps/nm/km, the dispersion slope of −0.04 ps/nm$^2$/km, and the effective core area of 47 μm$^2$, and the large-Aeff-type nonzero dispersion-shifted optical fibers 22-1 to 22-n have the wavelength dispersion of −4 ps/nm/km, the dispersion slope of −0.10 ps/nm$^2$/km, and the effective core area of 75 μm$^2$, at the wavelength of 1550 nanometers which is the wavelength of the signal light. The lengths of the optical fibers 21-1 to 21-n and the large-Aeff-type nonzero dispersion-shifted optical fibers 22-1 to 22-n are virtually the same.

Furthermore, the optical fiber transmission line 20 includes a dispersion-compensating optical fiber 23 for every 500 kilometers, using a standard single-mode optical fiber having a zero dispersion wavelength near 1310 nanometers, to compensate for an accumulated negative wavelength dispersion. The optical fiber transmission line 20 is installed to connect an optical signal transmitting apparatus and an optical signal receiving apparatus, so that a signal light output from the optical signal transmitting apparatus is transmitted to the optical signal receiving apparatus. At this time, an optical signal repeater for regenerating and relaying the optical signal is provided for every pair of the optical fibers 21-1 to 21-n and the large-Aeff-type nonzero dispersion-shifted optical fibers 22-1 to 22-n.

The large-Aeff-type nonzero dispersion-shifted optical fibers 22-1 to 22-n are single-mode optical fibers having a cutoff wavelength of 1500 nanometers that is shorter than the wavelength of the signal light. Therefore, by transmitting the signal light from the large-Aeff-type nonzero dispersion-shifted optical fiber 22-1 side, only the fundamental propagation mode is selectively excited, and the optical fibers 21-1 to 21-n propagates the signal light in the fundamental propagation mode. Furthermore, because the large-Aeff-type nonzero dispersion-shifted optical fibers 22-1 to 22-n have a larger effective core area of 75 µm$^2$, the optical fiber transmission line 20 makes a long-haul optical signal transmission possible by suppressing an increase of an accumulating discrepancy of the wavelength dispersion between optical signals compared to a conventional case while suppressing an occurrence of the nonlinear optical phenomena in virtually the same level as the conventional case, it is particularly suitable for a submarine cable.

Figure 6:
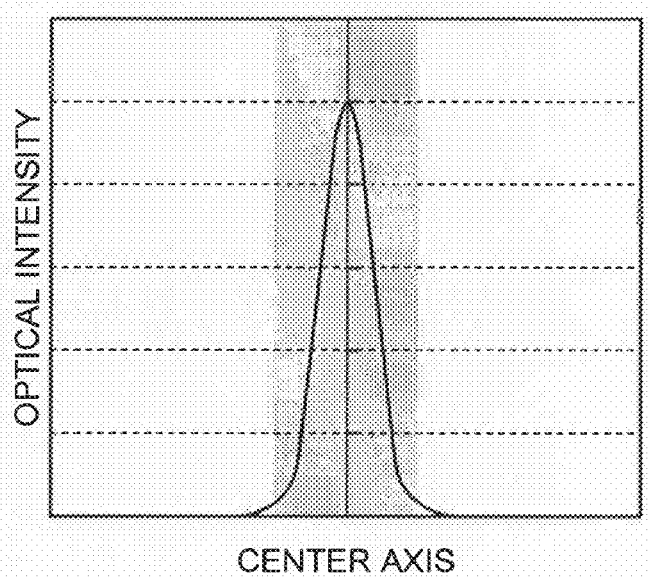
FIG. 6 is a graph showing a field distribution of the fundamental propagation mode of the optical fiber according to the first embodiment.
Figure 7:
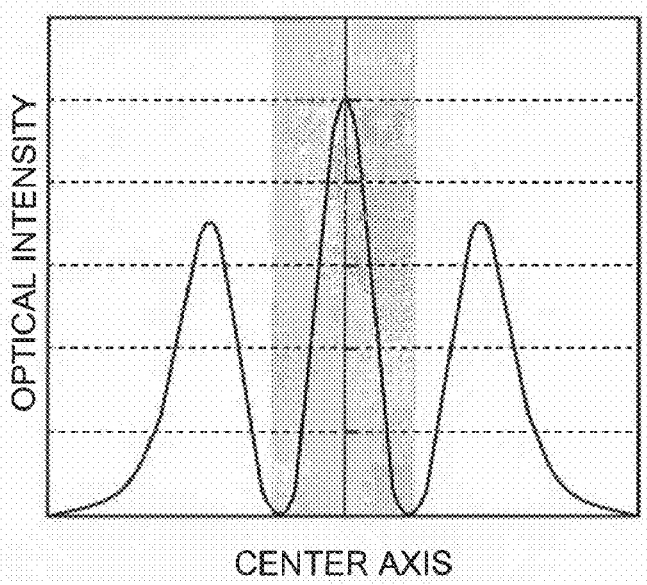
FIG. 7 is a graph showing a field distribution of a higher-order propagation mode of the optical fiber according to the first embodiment.
Figure 8:
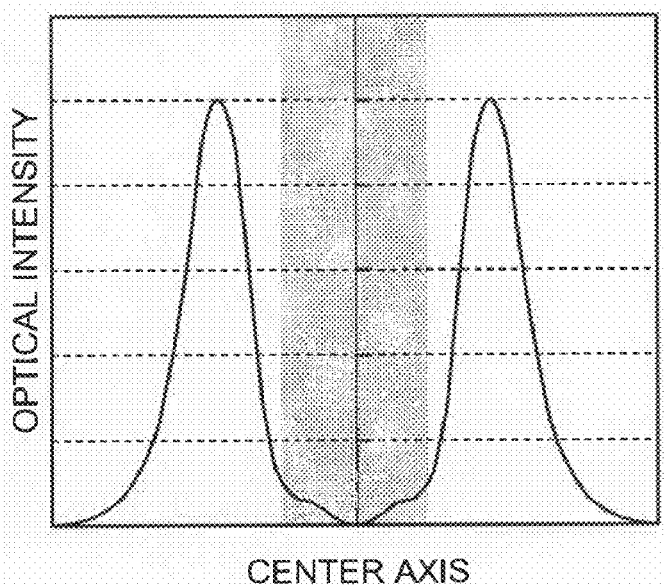
FIG. 8 is a graph showing another field distribution of a higher-order propagation mode of the optical fiber according to the first embodiment.
Figure 9:
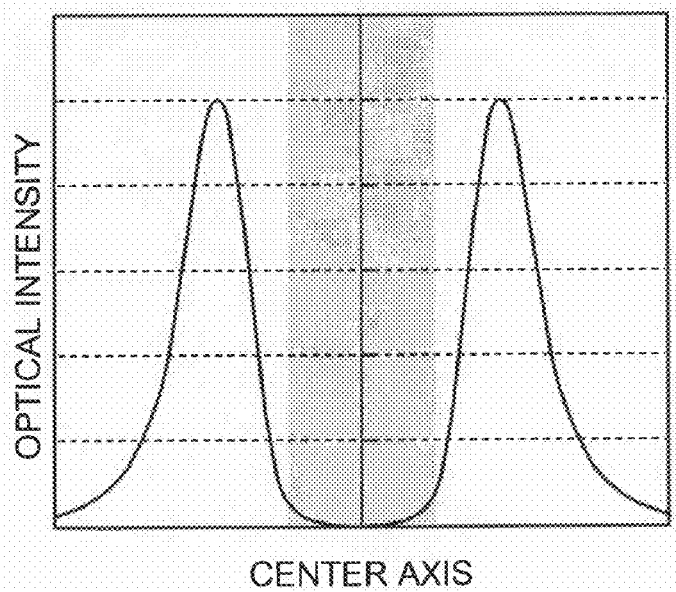
FIG. 9 is a graph showing still another field distribution of a higher-order propagation mode of the optical fiber according to the first embodiment.

A field distribution of each mode that can exist in the optical fibers 21-1 to 21-n in the optical fiber transmission line 20 according to the second embodiment will be explained in detail. FIG. 6 is a graph showing the field distribution of the fundamental propagation mode calculated from the design parameters of the optical fiber according to the first embodiment, and FIGS. 7 to 9 are graphs showing the field distributions of higher-order propagation modes. In FIGS. 6 to 9, the horizontal axis represents a position in the radial direction with the center point taken as the center axis of the optical fiber, and the vertical axis represents the optical intensity. Because the optical fibers 21-1 to 21-n have the cutoff wavelength longer than the wavelength of the signal light, they become a multimode optical fiber in which multiple propagation modes exist at the wavelength of the signal light when a single unit of the optical fiber transmits an optical signal. Namely, an LP01 mode that is the fundamental mode shown in FIG. 6 and the higher-order modes including an LP02 mode, an LP11 mode, and an LP21 mode shown in FIGS. 7 to 9 exist in the optical fiber. A shaded portion in each of the figures indicates an area where the field distribution of the large-Aeff-type nonzero dispersion-shifted optical fiber 22-1 that is connected at the earlier stage exists. As shown in FIGS. 8 and 9, because the field distributions of the LP11 mode and the LP21 mode from among the higher-order modes are broadened to outside, by providing the large-Aeff-type nonzero dispersion-shifted optical fiber 22-1 that is a single-mode optical fiber at the earlier stage of the optical fibers 21-1 to 21-n, as the optical fiber transmission line 20 according to the second embodiment, it is possible to avoid a coupling of the input light to the LP11 mode and the LP21 mode of the optical fibers 21-1 to 21-n. On the other hand, as shown in FIG. 7, because the LP02 mode has its field distribution in the center of the core, a possibility can be considered in which the input light is coupled to the LP02 mode of the optical fibers 21-1 to 21-n.

Figure 10:
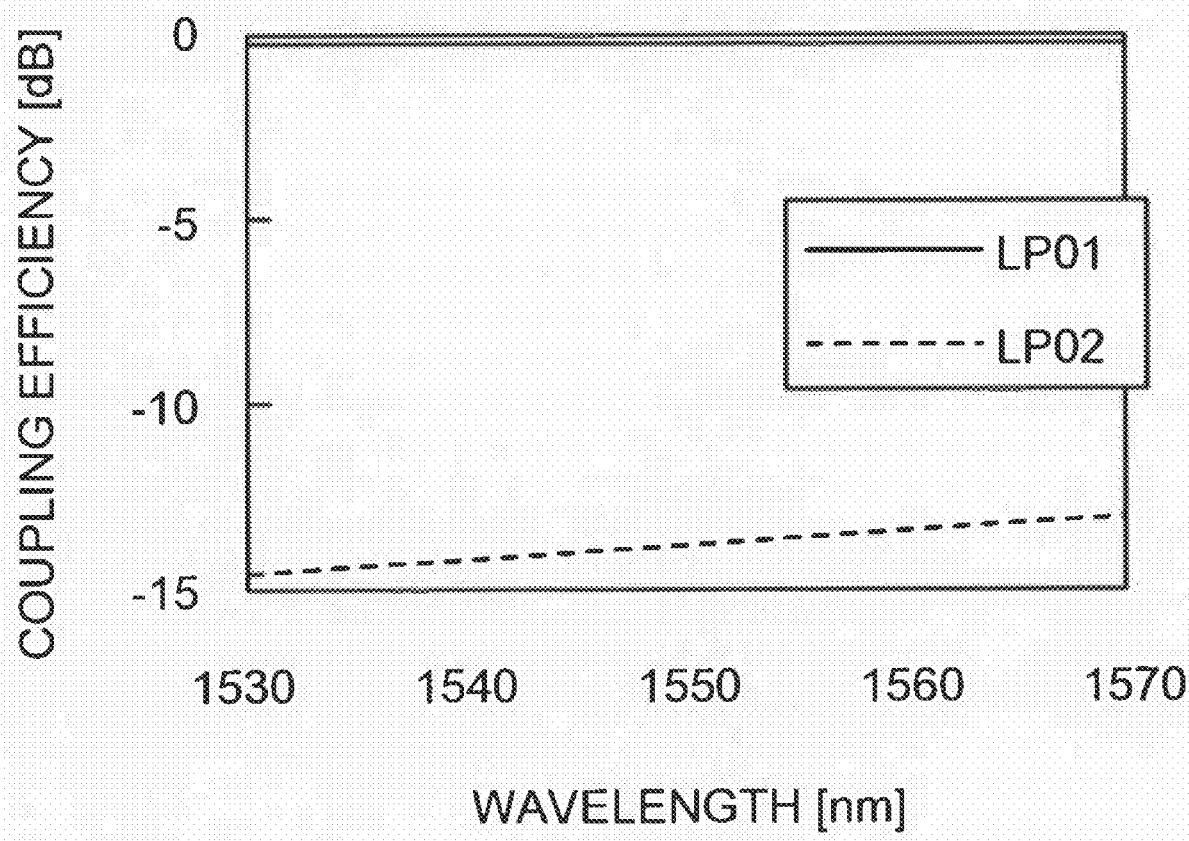
FIG. 10 is a graph showing a coupling efficiency of an input light from a standard single-mode optical fiber to an LP01 mode and an LP02 mode.

FIG. 10 is a graph showing a coupling efficiency of an input light to the LP01 mode and the LP02 mode from a standard single-mode optical fiber having a mode field diameter virtually the same as the mode field diameter of the large-Aeff-type nonzero dispersion-shifted optical fiber 22-1 connected at the earlier stage and a zero dispersion wavelength near 1310 nanometers. As shown in FIG. 10, because the coupling efficiency to the LP02 mode is sufficiently small compared to the coupling efficiency to the LP01 mode, the coupling to the LP02 mode can be ignored. In other words, in the optical fiber transmission line 20 according to the second embodiment, only the fundamental propagation mode is excited by transmitting the signal light from the large-Aeff-type nonzero dispersion-shifted optical fiber 22-1 side, which is the single-mode optical fiber, so that the optical fibers 21-1 to 21-n propagate the signal light in the fundamental propagation mode.

Figure 11:
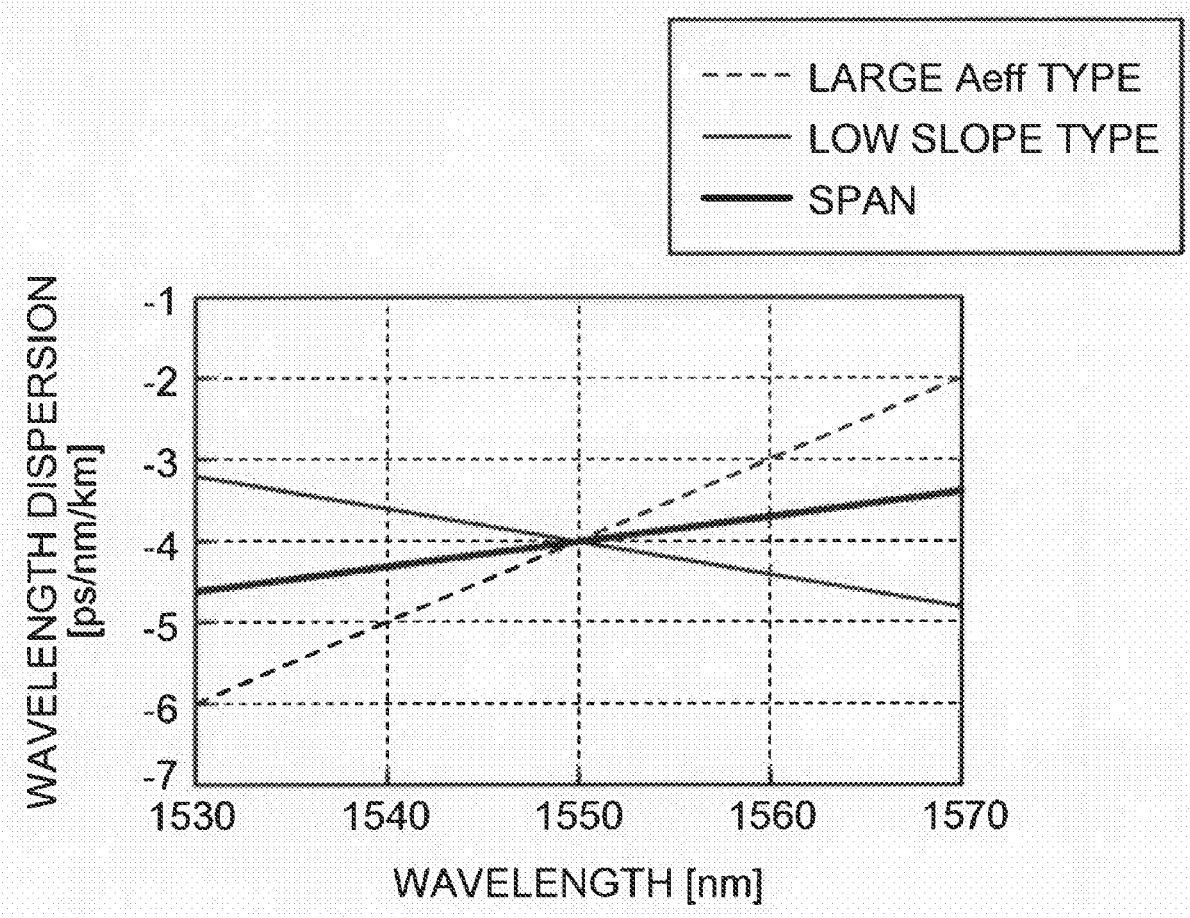
FIG. 11 is a graph showing a wavelength dispersion characteristic of the optical fiber transmission line according to the second embodiment.

FIG. 11 is a graph showing the wavelength dispersion characteristic of the optical fiber transmission line 20, where the horizontal axis represents the wavelength and the vertical axis represents the wavelength dispersion. In the legend, "large Aeff type" means the large-Aeff-type nonzero dispersion-shifted optical fibers 22-1 to 22-n, "low slope type" means the optical fibers 21-1 to 21-n, and "span" means a pair of the optical fibers 21-1 to 21-n and the large-Aeff-type nonzero dispersion-shifted optical fibers 22-1 to 22-n, i.e., an average wavelength dispersion in a relay span of an optical signal repeater.

As shown in FIG. 11, because the optical fiber transmission line 20 has an average dispersion slope of the relay span of about 0.03 ps/nm$^2$/km, a discrepancy of the average wavelength dispersion at both edges of the wavelength band from 1530 nanometers to 1570 nanometers is suppressed to −4±0.6 ps/nm/km, which can be preferably used for a WDM optical signal transmission.

Figure 12:
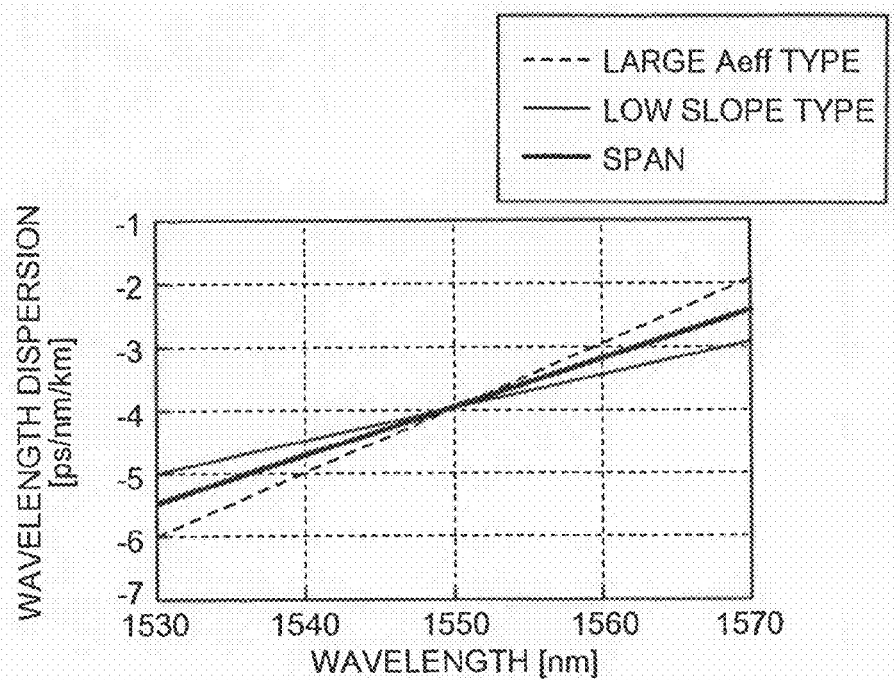
FIG. 12 is a graph showing a wavelength dispersion characteristic of a conventional optical fiber transmission line.

On the other hand, FIG. 12 is a graph showing the wavelength dispersion characteristic of a conventional optical fiber transmission line having the same structure as the optical fiber transmission line 20. This conventional optical fiber transmission line is built by alternately connecting nonzero dispersion-shifted optical fibers having the same characteristics as the large-Aeff-type nonzero dispersion-shifted optical fibers 22-1 to 22-n and conventional low-slope-type nonzero dispersion-shifted optical fibers.

As shown in FIG. 12, the conventional optical fiber transmission line has a discrepancy of the average wavelength dispersion of a relay span of −4±1.5 ps/nm/km at both edges of the wavelength band from 1530 nanometers to 1570 nanometers, which shows about three times of that of the optical fiber transmission line 20 according to the second embodiment.

Figure 13:
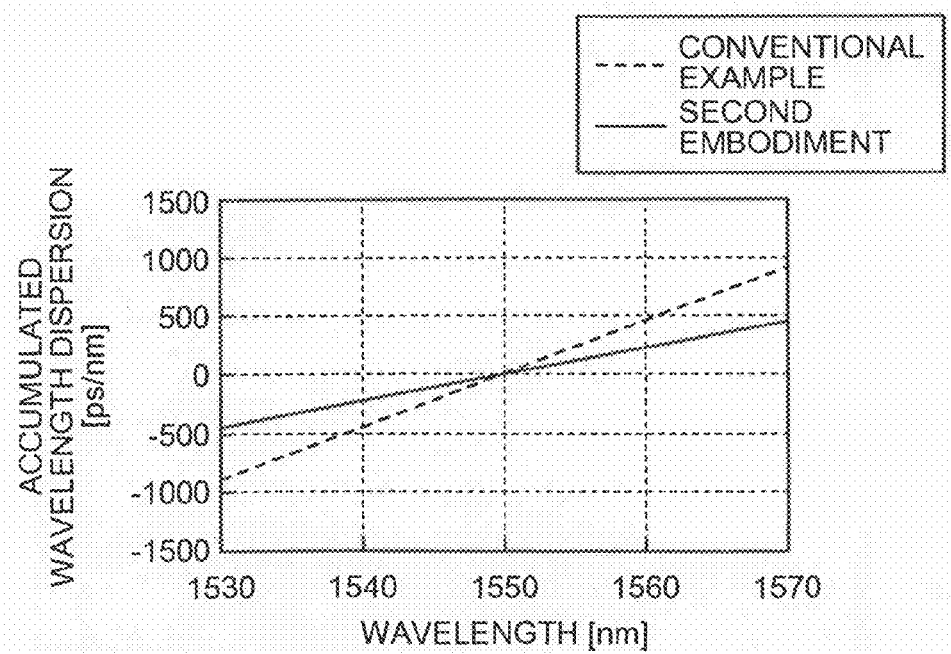
FIG. 13 is a graph showing accumulated wavelength dispersions in the entire transmission line including a dispersion-compensating single-mode optical fiber, in the optical fiber transmission line according to the second embodiment and in the conventional optical fiber transmission line.

FIG. 13 is a graph showing accumulated wavelength dispersions in the entire transmission line including a dispersion-compensating single-mode optical fiber, in the optical fiber transmission line 20 and in the conventional optical fiber transmission line. In the conventional optical fiber transmission line, an accumulated wavelength dispersion of ±900 ps/nm is remained at both edges of the wavelength band from 1530 nanometers to 1570 nanometers; however, in the optical fiber transmission line 20 according to the second embodiment, a discrepancy of the residual accumulated wavelength dispersion is suppressed to ±450 ps/nm, which makes it possible to realize a long-haul optical signal transmission with a better characteristic.

As in the second embodiment, if the optical fibers 21-1 to 21-n have a dispersion slope smaller than 0 ps/nm$^2$/km in the fundamental propagation mode at the wavelength of 1550 nanometers, not only the average dispersion slope of the relay span is suppressed, but also the dispersion slope of the entire optical fiber transmission line can be compensated, which is particularly desirable.

Figure 14:
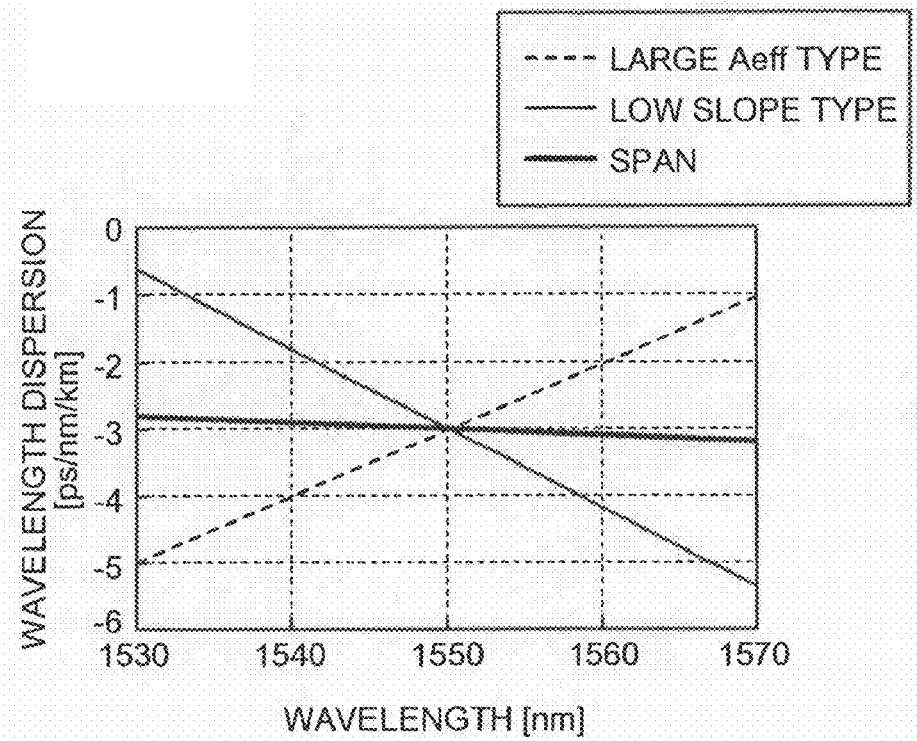
FIG. 14 is a graph showing a wavelength dispersion characteristic of an optical fiber transmission line according to a modification example of the second embodiment.

FIG. 14 is a graph showing the wavelength dispersion characteristic of an optical fiber transmission line according to a modification example of the second embodiment. The optical fiber transmission line according to the modification example has the same structure as that of the optical fiber transmission line 20 according to the second embodiment. In the optical fiber transmission line according to the modification example, optical fibers corresponding to the large-Aeff-type nonzero dispersion-shifted optical fibers 22-1 to 22-n have the wavelength dispersion of −3 ps/nm/km, the dispersion slope of 0.10 ps/nm²/km, and the effective core area of 75 μm², at the wavelength of 1550 nanometers. On the other hand, optical fibers corresponding to the optical fibers 21-1 to 21-n have the wavelength dispersion of −3 ps/nm/km, the dispersion slope of −0.12 ps/nm²/km, and the effective core area of 50 μm², at the wavelength of 1550 nanometers. As a result, as shown in FIG. 14, because the optical fiber transmission line according to the modification example has an average dispersion slope of the relay span of about −0.01 ps/nm²/km, a discrepancy of the average wavelength dispersion at both edges of the wavelength band from 1530 nanometers to 1570 nanometers is suppressed to −3±0.2 ps/nm/km, which can be preferably used for a WDM optical signal transmission.

Figure 15:
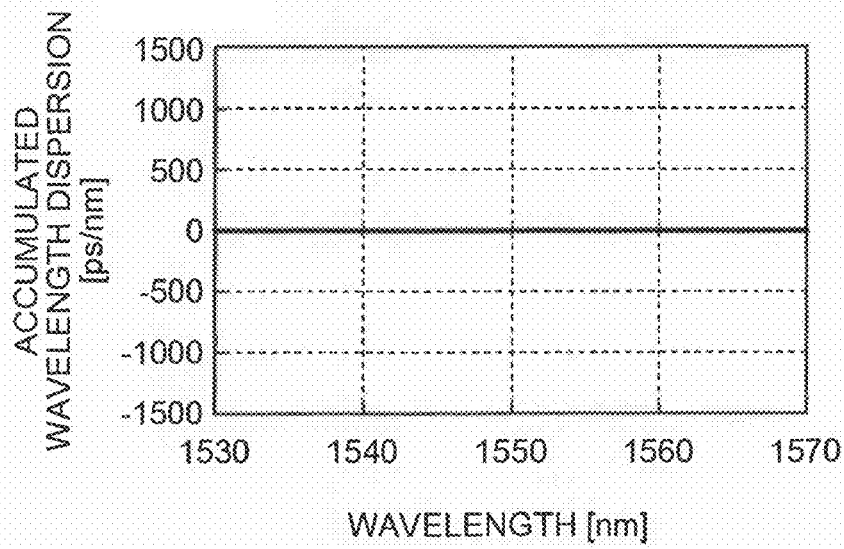
FIG. 15 is a graph showing an accumulated wavelength dispersion in the entire transmission line including a dispersion-compensating single-mode optical fiber, in the optical fiber transmission line according to the modification example of the second embodiment.

FIG. 15 is a graph showing an accumulated wavelength dispersion in the entire transmission line including a dispersion-compensating single-mode optical fiber, in the optical fiber transmission line according to the modification example of the second embodiment. The optical fiber transmission line according to the modification example has a negative average dispersion slope, and at the same time, an average dispersion-per-slope (DPS) at the wavelength of 1550 nanometers is virtually the same as a DPS of a dispersion-compensating single-mode optical fiber. Therefore, as shown in FIG. 15, a discrepancy of the accumulated wavelength dispersion at both edges of the wavelength band from 1530 nanometers to 1570 nanometers is substantially zero in the entire transmission line, which makes it possible to realize a long-haul optical signal transmission with an excellent characteristic. The DPS is obtained by dividing the wavelength dispersion by the dispersion slope.

Figure 16:
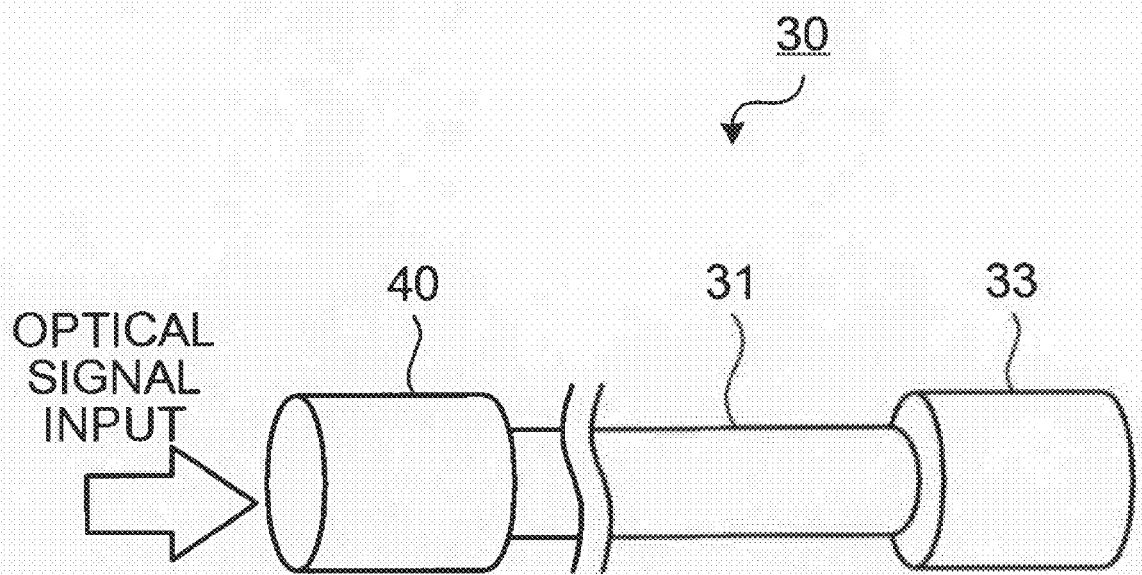
FIG. 16 is a schematic diagram of an optical fiber transmission line according to a third embodiment of the present invention.

FIG. 16 is a schematic diagram of an optical fiber transmission line 30 according to a third embodiment of the present invention. The optical fiber transmission line 30 is mainly built with an optical fiber 31 that is similar to the optical fiber according to the first embodiment. The optical fiber 31 has the wavelength dispersion of −3 ps/nm/km, the dispersion slope of −0.01 ps/nm²/km, and the effective core area of 65 μm², which show intermediate characteristics between the optical fibers 21-1 to 21-n and the large-Aeff-type nonzero dispersion-shifted optical fibers 22-1 to 22-n according to the second embodiment.

The optical fiber transmission line 30 includes a dispersion-compensating optical fiber 33 that is similar to the dispersion-compensating optical fiber 23 according to the second embodiment, for every 500 kilometers. Furthermore, in the same manner as the second embodiment, the optical fiber transmission line 30 is installed to connect an optical signal transmitting apparatus and an optical signal receiving apparatus, so that a signal light output from the optical signal transmitting apparatus is transmitted to the optical signal receiving apparatus. Because a typical optical signal transmitting apparatus is configured using a single-mode optical fiber, a single-mode optical fiber 40 of the optical signal transmitting apparatus is connected to one end of the optical fiber 31. As for the single-mode optical fiber 40, a single-mode optical fiber defined in the ITU-T G. 652 is generally used. Because the optical signal is input to the optical fiber 31 via the single-mode optical fiber 40 of the apparatus, only the fundamental propagation mode is selectively excited in the optical fiber 31. Furthermore, although an optical signal repeater is inserted in the optical fiber 31, so that an appropriate relay span is obtained, because a typical optical signal repeater is configured using a single-mode optical fiber, the optical signal is input in such a manner that only the fundamental propagation mode is selectively excited in the optical fiber 31, in the same manner as the case of the optical signal transmitting apparatus.

Figure 17:
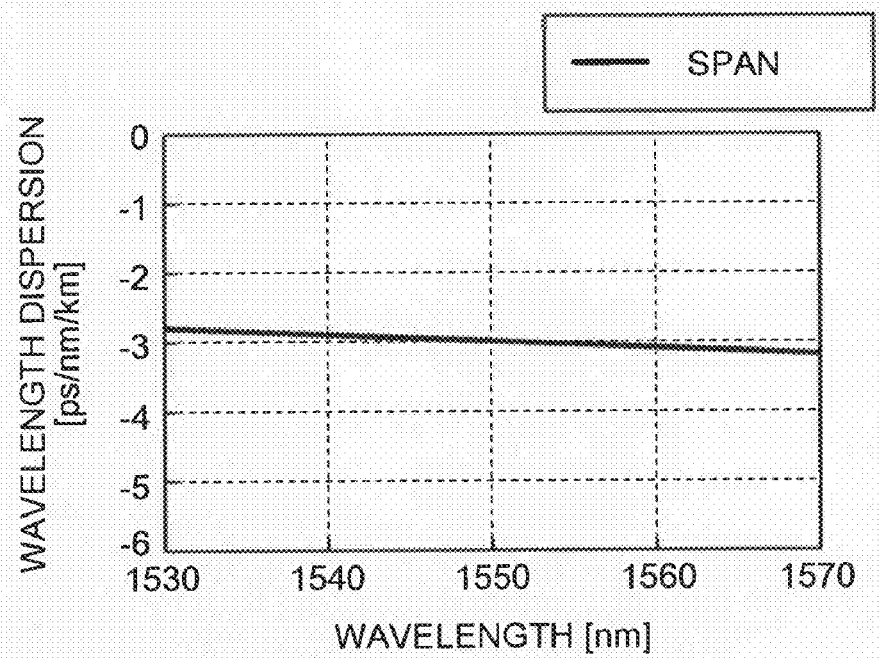
FIG. 17 is a graph showing a wavelength dispersion characteristic of the optical fiber transmission line according to the third embodiment.

FIG. 17 is a graph showing the wavelength dispersion characteristic of the optical fiber transmission line 30. In the same manner as the modification example of the second embodiment, the optical fiber transmission line 30 has a discrepancy of the average wavelength dispersion of the relay span at both edges of the wavelength band from 1530 nanometers to 1570 nanometers is suppressed to −3±0.2 ps/nm/km, which can be preferably used for a WDM optical signal transmission.

Figure 18:
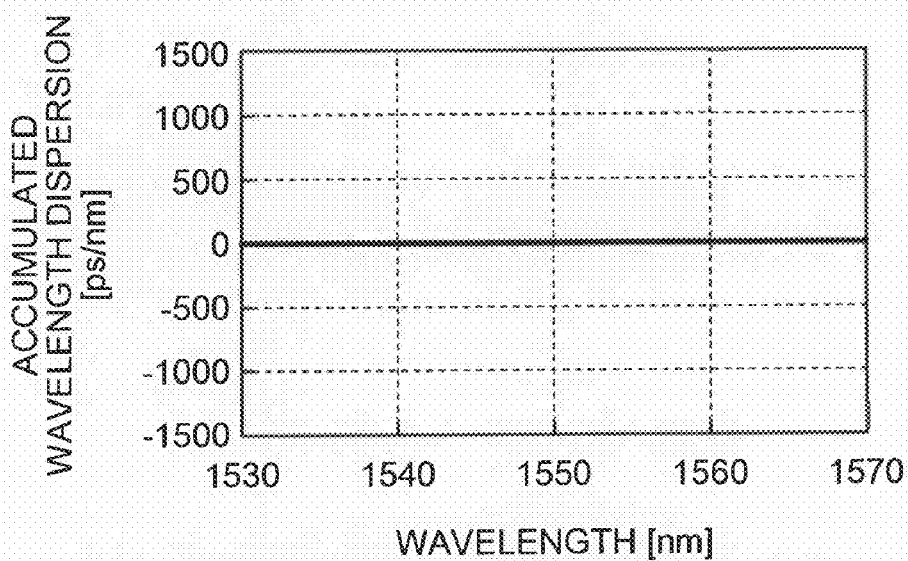
FIG. 18 is a graph showing an accumulated wavelength dispersion in the entire transmission line including a dispersion-compensating single-mode optical fiber, in the optical fiber transmission line according to the third embodiment.

FIG. 18 is a graph showing an accumulated wavelength dispersion in the entire transmission line including a dispersion-compensating single-mode optical fiber, in the optical fiber transmission line 30 according to the third embodiment. In the same manner as the modification example of the second embodiment, the optical fiber transmission line 30 has an average DPS at the wavelength of 1550 nanometers virtually the same as the DPS of a dispersion-compensating single-mode optical fiber. Therefore, as shown in FIG. 18, a discrepancy of the accumulated wavelength dispersion at both edges of the wavelength band from 1530 nanometers to 1570 nanometers is substantially zero in the entire transmission line, which makes it possible to realize a long-haul optical signal transmission with an excellent characteristic.

Subsequently, an optical transmission experiment is performed assuming the optical fiber transmission line 30 according to the third embodiment. The optical fiber 31 of 500 meters, which is similar to the optical fiber according to the first embodiment, an the single-mode optical fiber 40 that is defined in the ITU-T 652 are prepared, and then an optical fiber sample A1 is fabricated by connecting the optical fibers in such a manner that the center axes of the core regions of the optical fibers meet together.

After that, an optical signal is input from a facet of the single-mode optical fiber 40 of the optical fiber sample A1, and bit-error-rate (BER) characteristics of the optical signal transmitted through the optical fiber sample A1 is measured. The optical signal to be transmitted is obtained by superimposing an NRZ signal having a $2^{31}−1$ quasi-random bit pattern and a modulation frequency of 10 GHz/s to a laser light having a wavelength of 1551.465 nanometers output from a DFB laser source.

Figure 19:
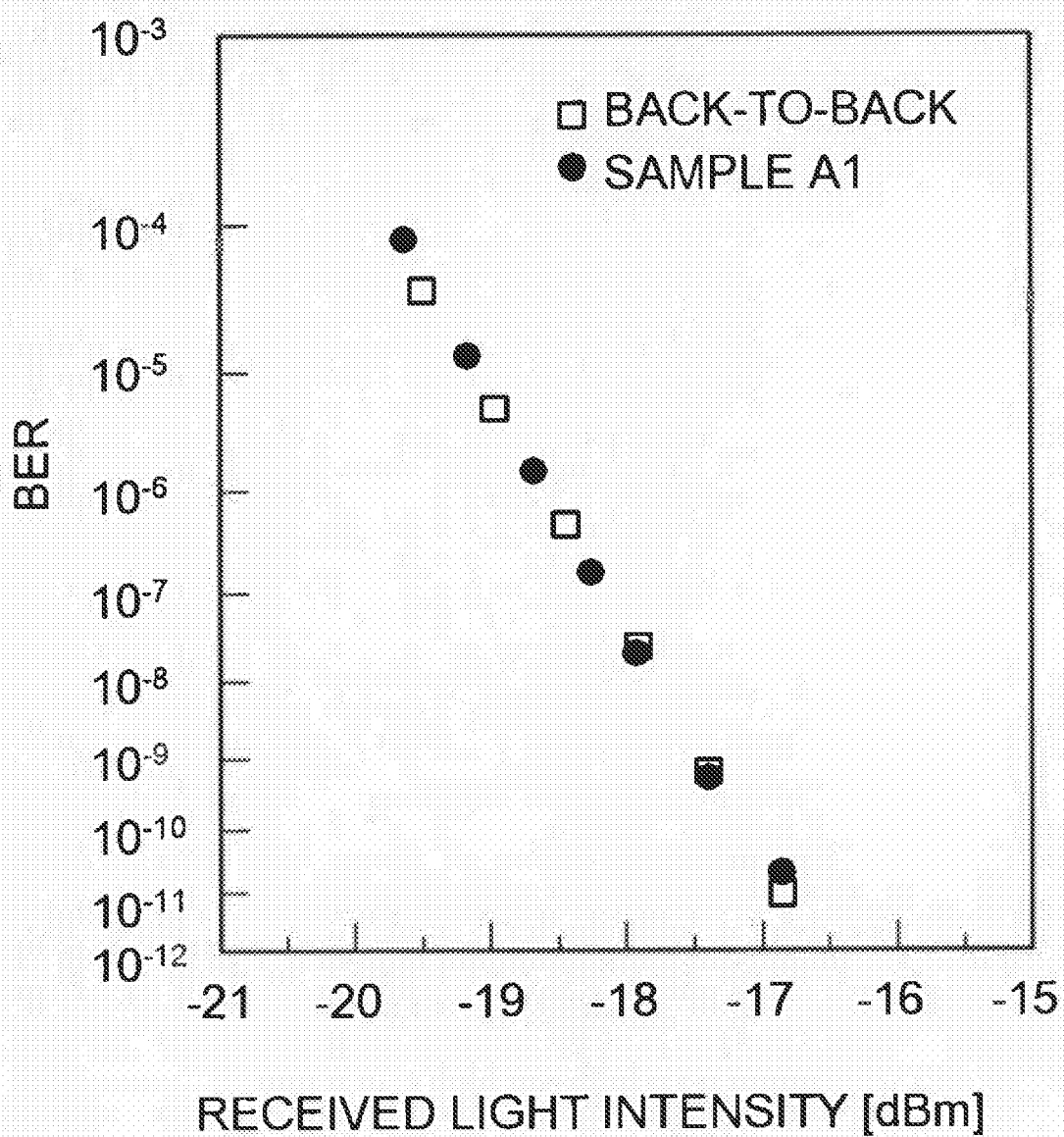
FIG. 19 is a graph showing a measurement result of the BER characteristics.

FIG. 19 is a graph showing a measurement result of the BER characteristics. As shown in FIG. 19, it is confirmed that a penalty-free optical transmission is realized by using the optical fiber sample A1 as the optical transmission line.

In the above embodiments, although the wavelength of the signal light is 1530 nanometers to 1570 nanometers, any wavelength can be used as long as it is the wavelength used for the optical signal transmission using the optical fiber, for example, a wavelength of 1570 nanometers to 1620 nanometers, which is called an L-band, can also be used.

Furthermore, in the above embodiments, although the standard single-mode optical fiber is used for the dispersion-compensating optical fiber, it is not specifically limited as long as the optical fiber has positive wavelength dispersion and dispersion slope at the wavelength of the signal light.

As described above, according to an aspect of the present invention, by giving a cutoff wavelength longer than a wavelength of a signal light to an optical fiber, a tradeoff relationship between the effective core area and the dispersion slope in a fundamental propagation mode is relieved, and as a result, it is possible to considerably suppress an increase of an accumulating discrepancy of the wavelength dispersion between optical signals compared to a conventional case, while suppressing an occurrence of the nonlinear optical phenomena in virtually the same level as the conventional case.

Furthermore, according to another aspect of the present invention, by employing the optical fiber according to the present invention in an optical fiber transmission line, it is possible to provide a long-haul optical signal transmission in which an increase of an accumulating discrepancy of the wavelength dispersion between optical signals can be considerably suppressed, compared to a conventional case, while suppressing an occurrence of the nonlinear optical phenomena in virtually the same level as the conventional case.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber that transmits a signal light in a fundamental propagation mode, the optical fiber having
    a cutoff wavelength longer than a wavelength of the signal light,
    a wavelength dispersion of the fundamental propagation mode of −5 ps/nm/km to −1 ps/nm/km at a wavelength of 1550 nanometers,
    an effective core area of the fundamental propagation mode larger than 45 μm² at the wavelength of 1550 nanometers, and
    a dispersion slope of the fundamental propagation mode smaller than 0.03 ps/nm²/km at the wavelength of 1550 nanometers, wherein the dispersion slope of the fundamental propagation mode is smaller than 0 ps/nm²/km at the wavelength of 1550 nanometers.

2. The optical fiber according to claim 1, wherein the optical fiber comprises:
    a center core region;
    an inner core layer that is formed around the center core region and that has a refractive index lower than a refractive index of the center core region;
    an outer core layer that is formed around the inner core layer and that has a refractive index higher than the refractive index of the inner core layer; and
    a cladding layer that is formed around the outer core layer and that has a refractive index higher than the refractive index of the inner core layer and lower than the refractive index of the outer core layer, wherein
    a relative refractive index difference of the center core region with respect to the cladding layer is equal to or smaller than 0.65%,
    a ratio of an outer diameter of the inner core layer to a diameter of the center core region is equal to or larger than 1.3,
    a ratio of an outer diameter of the outer core layer to the diameter of the center core region is equal to or larger than 2.0, and
    the diameter of the center core region is equal to or larger than 5.9 micrometers.

3. The optical fiber according to claim 1, wherein
    the wavelength of the signal light is 1530 nanometers to 1570 nanometers, and
    the cutoff wavelength is equal to or longer than 1600 nanometers.

4. The optical fiber according to claim 1, wherein a bending loss of the fundamental propagation mode in a case of winding 16 turns with a winding diameter of 20 millimeters is equal to or smaller than 10 dB/m at the wavelength of 1550 nanometers.

5. An optical fiber transmission line comprising:
    an optical fiber that transmits a signal light in a fundamental propagation mode, the optical fiber having
    a cutoff wavelength longer than a wavelength of the signal light,
    a wavelength dispersion of the fundamental propagation mode of −5 to −1 ps/nm/km at a wavelength of 1550 nanometers,
    an effective core area of the fundamental propagation mode larger than 45 μm² at the wavelength of 1550 nanometers, and
    a dispersion slope of the fundamental propagation mode smaller than 0.03 ps/nm²/km at the wavelength of 1550 nanometers, wherein the dispersion slope of the fundamental propagation mode is smaller than 0 ps/nm²/km at the wavelength of 1550 nanometers.

6. The optical fiber transmission line according to claim 5, further comprising a single-mode optical fiber having a cutoff wavelength shorter than the wavelength of the signal light, the single-mode optical fiber being configured to be connected to the optical fiber, wherein
    the optical fiber transmission line transmits the signal light from the single-mode optical fiber side.

7. The optical fiber transmission line according to claim 6, wherein the single-mode optical fiber has a wavelength dispersion of −8 ps/nm/km to −1 ps/nm/km at the wavelength of 1550 nanometers, a dispersion slope larger than the dispersion slope of the fundamental propagation mode of the optical fiber at the wavelength of 1550 nanometers, and an effective core area larger than the effective core area of the fundamental propagation mode of the optical fiber at the wavelength of 1550 nanometers.

* * * * *